US012485703B2

(12) United States Patent
Rollins et al.

(10) Patent No.: US 12,485,703 B2
(45) Date of Patent: Dec. 2, 2025

(54) TIRE WITH RFID ENCLOSED IN DIFFERENT RUBBER LAYERS AND RELATED METHODS

(71) Applicant: Bridgestone Americas Tire Operations, LLC, Nashville, TN (US)

(72) Inventors: Claude David Rollins, Knightdale, NC (US); Seth Martin Miller, Wooster, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 6 days.

(21) Appl. No.: 18/572,841

(22) PCT Filed: Jun. 24, 2022

(86) PCT No.: PCT/US2022/073133
§ 371 (c)(1),
(2) Date: Dec. 21, 2023

(87) PCT Pub. No.: WO2023/009923
PCT Pub. Date: Feb. 2, 2023

(65) Prior Publication Data
US 2024/0286436 A1  Aug. 29, 2024

Related U.S. Application Data

(60) Provisional application No. 63/225,836, filed on Jul. 26, 2021.

(51) Int. Cl.
B60C 1/00 (2006.01)
B60C 19/00 (2006.01)
B60C 23/00 (2006.01)
C08L 7/00 (2006.01)
C08L 9/00 (2006.01)
C08L 9/06 (2006.01)
B60C 23/04 (2006.01)
C08K 3/04 (2006.01)
C08K 3/36 (2006.01)

(52) U.S. Cl.
CPC ............ B60C 1/00 (2013.01); B60C 19/00 (2013.01); C08L 7/00 (2013.01); C08L 9/00 (2013.01); C08L 9/06 (2013.01); B60C 23/0433 (2013.01); C08K 3/04 (2013.01); C08K 3/36 (2013.01)

(58) Field of Classification Search
CPC .......... B60C 2019/004; B60C 23/0433; B60C 23/0491; B60C 23/0493; B60C 1/00
See application file for complete search history.

(56) References Cited

U.S. PATENT DOCUMENTS

| 8,430,142 | B2 | 4/2013 | Incavo et al. |
| 9,701,081 | B2 | 7/2017 | D'Sikocky et al. |
| 9,884,462 | B2 | 2/2018 | Hotaling et al. |
| 10,525,770 | B2 | 1/2020 | Balnis et al. |
| 2005/0126704 | A1 | 6/2005 | Wacker |
| 2005/0132788 | A1 | 6/2005 | Lionetti et al. |
| 2006/0164250 | A1 | 7/2006 | Kawai |
| 2007/0179247 | A1* | 8/2007 | Sandstrom ............ B60C 1/0016 525/191 |
| 2009/0015415 | A1 | 1/2009 | Uehara et al. |
| 2011/0105669 | A1* | 5/2011 | Ignatz-Hoover ......... C08K 5/54 524/588 |
| 2017/0368874 | A1 | 12/2017 | Balnis et al. |
| 2019/0039341 | A1 | 2/2019 | Keenan et al. |
| 2019/0054781 | A1 | 2/2019 | Balnis et al. |
| 2019/0300680 | A1 | 10/2019 | Cho et al. |
| 2020/0070598 | A1 | 3/2020 | Noel et al. |
| 2020/0094634 | A1 | 3/2020 | Decostar et al. |
| 2020/0164605 | A1 | 5/2020 | Yoshida |
| 2021/0070110 | A1 | 3/2021 | Joulin et al. |
| 2024/0286436 | A1 | 8/2024 | Rollins et al. |
| 2024/0286439 | A1 | 8/2024 | Rollins et al. |

FOREIGN PATENT DOCUMENTS

| CN | 204314922 U | 5/2015 |
| CN | 206557816 U | 10/2017 |
| CN | 209168167 U | 7/2019 |
| EP | 4019291 A | 6/2022 |
| JP | 2020-083317 A | 6/2020 |
| JP | 2021-030574 A | 3/2021 |
| KR | 10-1059589 B1 | 8/2011 |
| KR | 2018-0199982 A | 10/2018 |

(Continued)

OTHER PUBLICATIONS

Bates, Ken, Processing additives for silica—a historical perspective, Rubber News, Sep. 5, 2022, pp. 24-27.
RFID4u, "Dig Deep—Construction of RFID Tags," copyright 2021, downloaded May 18, 2021 from : https://rfid4u.com/dig-deep-construction-of-rfid-tags/, 6 pages.
Uijlenbroek, Jos, "Column: RFID is transforming the tire industry," Rubber & Plastics News, Jun. 21, 2018, (8 pages).
Nocil Limited, "Vulcanization and Accelerators," downloaded Aug. 18, 2015, available at https://www.scribd.com/document/283973137/Vulcanization-and-Accelerators.

(Continued)

Primary Examiner — Justin R Fischer

(57) ABSTRACT

Disclosed herein is a tire having an electronic communication module including a radio device where the radio device is positioned between a first rubber layer and a second rubber layer, with the second rubber layer having a T50 cure time at 160° C. that is than the T50 cure time of the first rubber layer. Also disclosed are related methods for curing a tire with an electronic communication module including a radio device positioned between a first rubber layer and a second rubber layer, with the second rubber layer having a T50 cure time at 160° C. that is than the T50 cure time of the first rubber layer.

14 Claims, No Drawings

(56) References Cited

FOREIGN PATENT DOCUMENTS

WO        WO-03105509 A1 * 12/2003   ......... B60C 23/0493
WO    WO-2016060851 A1 * 4/2016   ......... B29D 30/0061

OTHER PUBLICATIONS

International Preliminary Report on Patentability and Written Opinion from application PCT/US2022/073132, Jan. 18, 2024, 8 pages.
International Preliminary Report on Patentability and Written Opinion from application PCT/US2022/073133, Jan. 18, 2024, 8 pages.
International Search Report from application PCT/US2022/073132, Oct. 19, 2022, 4 pages.
International Search Report from application PCT/US2022/073133, Oct. 19, 2022, 3 pages.
Supplementary European Search Report and Search Opinion from U.S. Appl. No. 22/850,425, mailed May 19, 2025.
Supplementary European Search Report and Search Opinion from U.S. Appl. No. 22/850,426, mailed May 19, 2025.

* cited by examiner

TIRE WITH RFID ENCLOSED IN DIFFERENT RUBBER LAYERS AND RELATED METHODS

CROSS-REFERENCE TO RELATED APPLICATION

This application is a national stage of PCT/US2022/077133 filed Jun. 24, 2022, which claims priority to and any other benefit of U.S. Provisional Patent Application Ser. No. 63/225,836, filed Jul. 26, 2021, all of which are hereby incorporated by reference in their entirety.

FIELD

The present application is directed to a tire containing a RFID or electronic communication module with a radio device that is enclosed between layers of different rubber compositions and to related methods for curing a tire with the enclosed RFID.

BACKGROUND

Electronic devices (often referred to as radio frequency information devices or RFID) may be integrated into a tire to provide functions such as identification and tracking during manufacture, distribution, and use of the tire. Such devices can also function to monitor physical parameters such as pressure and temperature during use of the tire.

Given the wide variety of available identification and monitoring devices, a wide variety of mounting configurations also exist for these devices. Exemplary known mounting configurations include incorporating the monitoring device into a tire sidewall, incorporating the monitoring device into the bead filler, attaching the device with a patch or adhesive to the tire sidewall, attaching the device directly to the innerliner with a patch or an adhesive, connecting the device to the rim that supports the tire, and mounting the device to the valve stem of the wheel.

SUMMARY

Disclosed herein is a tire having an electronic communication module including a radio device where the radio device is positioned between a first rubber layer and a second rubber layer, with the second rubber layer having a T50 cure time at 160° C. that is greater than the T50 cure time of the first rubber layer. Also disclosed are related methods for curing a tire with an electronic communication module including a radio device positioned between a first rubber layer and a second rubber layer, with the second rubber layer having a T50 cure time at 160° C. that is greater than the T50 cure time of the first rubber layer.

In a first embodiment, a tire is disclosed which has an electronic communication module including a radio device, with the radio device positioned between a first rubber layer and a second rubber layer. The first rubber layer is comprised of 100 parts of at least one diene-based rubber, at least one filler, and a cure package and the first rubber layer has a T50 cure time T50-1 at 160° C. of about 1.5 to about 3.5 minutes, preferably about 2 to about 3 minutes. The second rubber layer is comprised of at least one diene-based rubber, at least one filler, and a cure package, and the second rubber layer has a T50 cure time T50-2 at 160° C. that is greater than T50-1 and is about 2.5 to about 5 minutes, preferably about 3 to about 4 minutes. According to the first embodiment, the first and second rubber layers each independently have a thickness of about 0.4 to about 3 mm, preferably about 0.5 to about 2 mm.

In a second embodiment, a process is provided for curing a tire with an electronic communication module. According to the process of the second embodiment, an uncured tire carcass and an electronic communication module including an enclosed radio device positioned between a first rubber layer and a second rubber layer are provided. The first rubber layer is comprised of 100 parts of at least one diene-based rubber, at least one filler, and a cure package and the first rubber layer has a T50 cure time T50-1 at 160° C. of about 1.5 to about 3.5 minutes, preferably about 2 to about 3 minutes. The second rubber layer is comprised of at least one diene-based rubber, at least one filler, and a cure package, and the second rubber layer has a T50 cure time T50-2 at 160° C. that is greater than T50-1 and is about 2.5 to about 5 minutes, preferably about 3 to about 4 minutes. According to the second embodiment, the first and second rubber layers each independently have a thickness of about 0.4 to about 3 mm, preferably about 0.5 to about 2 mm. Further according to the process of the second embodiment, the enclosed radio device (i.e., the radio device that is positioned between the first and second rubber layers) is positioned against at least one component of the uncured tire carcass, and then the uncured tire carcass is cured together with the enclosed radio device.

DETAILED DESCRIPTION

Disclosed herein is a tire having an electronic communication module including a radio device where the radio device is positioned between a first rubber layer and a second rubber layer, with the second rubber layer having a T50 cure time at 160° C. that is greater than the T50 cure time of the first rubber layer. Also disclosed are related methods for curing a tire with an electronic communication module including a radio device positioned between a first rubber layer and a second rubber layer, with the second rubber layer having a T50 cure time at 160° C. that is greater than the T50 cure time of the first rubber layer.

In a first embodiment, a tire is disclosed which has an electronic communication module including a radio device, with the radio device positioned between a first rubber layer and a second rubber layer. The first rubber layer is comprised of 100 parts of at least one diene-based rubber, at least one filler, and a cure package and the first rubber layer has a T50 cure time T50-1 at 160° C. of about 1.5 to about 3.5 minutes, preferably about 2 to about 3 minutes. The second rubber layer is comprised of at least one diene-based rubber, at least one filler, and a cure package, and the second rubber layer has a T50 cure time T50-2 at 160° C. that is greater than T50-1 and is about 2.5 to about 5 minutes, preferably about 3 to about 4 minutes. According to the first embodiment, the first and second rubber layers each independently have a thickness of about 0.4 to about 3 mm, preferably about 0.5 to about 2 mm.

In a second embodiment, a process is provided for curing a tire with an electronic communication module. According to the process of the second embodiment, an uncured tire carcass and an electronic communication module including an enclosed radio device positioned between a first rubber layer and a second rubber layer are provided. The first rubber layer is comprised of 100 parts of at least one diene-based rubber, at least one filler, and a cure package and the first rubber layer has a T50 cure time T50-1 at 160° C. of about 1.5 to about 3.5 minutes, preferably about 2 to about 3 minutes. The second rubber layer is comprised of at least one diene-based rubber, at least one filler, and a cure package, and the second rubber layer has a T50 cure time T50-2 at 160° C. that is greater than T50-1 and is about 2.5 to about 5 minutes, preferably about 3 to about 4 minutes. According to the second embodiment, the first and second rubber layers each independently have a thickness of about 0.4 to about 3 mm, preferably about 0.5 to about 2 mm. Further according to the process of the second embodiment, the enclosed radio device (i.e., the radio device that is positioned between the first and second rubber layers) is positioned against at least one component of the uncured tire carcass, and then the uncured tire carcass is cured together with the enclosed radio device.

Definitions

The terminology as set forth herein is for description of the embodiments only and should not be construed as limiting the invention as a whole.

As used herein, the term "majority" by weight refers to more than 50% by weight.

Unless otherwise indicated herein, the term "Mooney viscosity" refers to the Mooney viscosity, $ML_{1+4}$. As those of skill in the art will understand, a rubber composition's Mooney viscosity is measured prior to vulcanization or curing.

As used herein the term "natural rubber" means naturally occurring rubber such as can be harvested from sources such as Hevea rubber trees and non-Hevea sources (e.g., guayule shrubs and dandelions such as TKS). In other words, the term "natural rubber" should be construed so as to exclude synthetic polyisoprene.

As used herein, "nitrogen surface area" refers to the nitrogen absorption specific surface area ($N_2SA$) of particulate material, including but not limited to silica filler, as discussed herein. The nitrogen surface area can be determined by various standard methods including those mentioned below.

As used herein, the term "phr" means parts per one hundred parts rubber. The 100 parts rubber refers to 100 parts of the at least one diene-based elastomer.

As used herein the term "polyisoprene" means synthetic polyisoprene. In other words, the term is used to indicate a polymer that is manufactured from isoprene monomers, and should not be construed as including naturally occurring rubber (e.g., Hevea natural rubber, guayule-sourced natural rubber, or dandelion-sourced natural rubber). However, the term polyisoprene should be construed as including polyisoprenes manufactured from natural sources of isoprene monomer.

Electronic Communication Module

As mentioned above, the present disclosure generally relates to a tire containing a RFID or electronic communication module including a radio device that is enclosed between layers of different rubber compositions and to related methods for curing a tire with the enclosed RFID. According to the first and second embodiments disclosed herein, the electronic communication module includes a radio device which can generally be understood as including at least a main body and an antenna. As discussed in more detail below, the radio device is positioned between a first rubber layer and a second rubber layer prior to being cured with other components of the tire (e.g., inner liner, body ply or plies, sidewall, etc.). By stating that the radio device is positioned between the two rubber layers is meant that it is enclosed between the two layers and/or entirely surrounded by them. The first rubber layer and the second rubber layer are referred herein as being different since they will have different compositions and as a result of the different compositions a different T50 cure time (as measured at 160° C.), with the T50 cure time of the second rubber layer (referred to herein as T50-2) being greater than the T50 cure time of the first rubber layer (referred to herein as T50-1). Use of the two different rubber layers (as described herein) provides an advantage in ensuring that the radio device is positioned appropriately within the tire by minimizing or eliminating movement of the radio device during curing. Thus, according to the first and second embodiments disclosed herein, an electronic communication module with a radio device that has been enclosed in the first and second rubber layers will remain enclosed between the first and second rubber layers even after curing thereby reducing the chances of the radio device moving through or into one of the rubber layers during curing. Movement through or into a rubber layer during curing can otherwise cause the radio device to either be exposed through the surface of a rubber layer (and visible within the tire) where it will be prone to damage or to sink into the inner liner creating a potential for damage to the body ply or plies.

First Rubber Layer

As mentioned above, according to the first and second embodiments, the radio device is positioned between a first rubber layer and a second rubber layer. The T50 cure time of the first rubber layer (T50-1) is less than the T50 cure time of the second rubber layer (T50-2). The first rubber layer is comprised of (includes) 100 parts of at least one diene-based rubber, at least one filler and a cure package. As used herein, the phrase diene-based rubber is intended to refer to polymers or copolymers which are made from at least one type of conjugated diene monomer. Generally, non-limiting examples of diene-based rubbers include natural rubber, polyisoprene, styrene-butadiene rubber, and polybutadiene. The particular ingredients used for the at least one diene based rubber, at least one filler, and cure package of the first rubber layer may vary, but are selected so as to cause the T50-1 cure time to be about 1.5 to about 3.5 minutes or 1.5 to 3.5 minutes (e.g., 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, or 3.5 minutes), preferably about 2 to about 3 minutes or 2 to 3 minutes (e.g., 2.1, 2.2, 2.3, 2.4, 2.5, 2.6, 2.7, 2.8, 2.9, or 3 minutes).

In certain embodiments of the first and second embodiments, the first rubber layer will meet at least one of the following: (a) an elongation at break at 23° C. of less than 150% (e.g., 149%, 145%, 140%, 135%, 130%, 125%, 120%, 115%, 110%, 105%, 100%, 95%, 90%, 85%, 80%, 75%, 70%, 65%, 60%, etc.), preferably about 100% to about 70% or 100% to 70% (e.g., 100%, 95%, 90%, 85%, 80%, 75%, or 70%); (b) a 50% modulus at 23° C. of at least 3.5 MPa (e.g., 3.5 MPa, 4 MPa, 4.5 MPa, 5 MPa, 5.5 MPa, 6 MPa, 6.5 MPa, 7 MPa, 7.5 MPa, 8 MPa, etc.), preferably about 4 to about 6 MPa or 4 to 6 MPa (e.g., 4 MPa, 4.5 MPa, 5 MPa, 5.5 MPa, or 6 MPa); (c) a tension at break at 23° C. of at least 9 MPa (e.g., 9 MPa, 9.5 MPa, 10 MPa, 10.5 MPa, 11 MPa, 11.5 MPa, 12 MPa, 12.5 MPa, 13 MPa, 13.5 MPa, 14 MPa, 14.5 MPa, 15 MPa, 15.5 MPa, 16 MPa, 17, MPa, 18 MPa, etc.) preferably about 10 to about 15 MPa or 10 to 15 MPa (e.g., 10 MPa, 10.5 MPa, 11 MPa, 11.5 MPa, 12 MPa, 12.5 MPa, 13 MPa, 13.5 MPa, 14 MPa, 14.5 MPa, or 15 MPa); or (d) a Mooney viscosity ML1+4 at 130° C. of about 43 to about 57 or 43 to 57 (e.g., 43, 44, 45, 46, 47, 48, 49, 50, 51, 52, 53, 54, 55, 56, or 57), preferably about 45 to about 50 or 45 to 50 (e.g., 45, 46, 47, 48, 49 or 50).

An elongation at break measurement (in terms of % elongation) is also referred to as Eb and provides an indication of a rubber composition's tear resistance. A tensile at break measurement (in units of MPa) is also referred to as Tb and provides an indication of a rubber composition's strength by measuring the maximum stress it can withstand before breaking. Elongation at break and tension at break can be measured following the guidelines of, but not restricted to, the standard procedure described in ASTM D-412, with dumbbell-shaped samples having a cross-section dimension of 4 mm in width and 1.9 mm in thickness at the center. During measurement, specimens may be strained at a constant rate (20% per second) and the resulting force recorded as a function of extension (strain). Eb and Tb taken at 23° C. are sometimes referred to as room temperature measurements. A 50% modulus measurement (in terms of MPa) is also referred to as M50 and measures tensile stress of a sample of the rubber composition at 50% elongation. The 50% modulus measurement is not a true modulus measurement and can be measured using the same method described for Eb and Tb. The Mooney viscosity ML1+4 at 130° C. can be determined using an Alpha Technologies Mooney viscometer with a large rotor, a one minute warm-up time, and a four minute running time, and, hence is referred to as Mooney1+4 or ML1+4. More specifically, such Mooney viscosities are measured by preheating an uncured sample to 130° C. for one minute before the rotor starts, and the Mooney viscosity is recorded for each sample as the torque at four minutes after the rotor is started.

In certain embodiments of the first and second embodiments, the first layer has a shore A hardness at 23° C. of at least 70 (e.g., 70, 75, 80, 85, 90, 95, or 100), preferably 70 to 90 (e.g., 70, 72, 74, 75, 76, 78, 80, 82, 84, 85, 86, 88, or 90), more preferably 74 to 84 (e.g., 74, 75, 76, 77, 78, 79, 80, 81, 82, 83, or 84). The shore A hardness can be determined according to ASTM D2240, with a sample size having a minimum 0.25 inch gauge and 1 inch width, and curing conditions of 40 minutes at 150° C.

In preferred embodiments of the first and second embodiments, the first rubber layer meets each of the foregoing (a)-(d), preferably each of (a)-(d) in their preferable ranges; in certain such embodiments, the first rubber layer also meets the shore A hardness range, preferably in the preferably range and more preferably in the more preferably range.

According to the first and second embodiments disclosed herein, the rubber or rubbers used to comprise the 100 parts of at least one diene-based rubber in the first rubber layer may vary. Overall (or in total), 100 parts of rubber will be present in the first rubber layer. As will be understood by those having skill in the art, 100 parts of rubber is used so that the other ingredients of the rubber layer can be discussed in amounts of parts per 100 parts rubber or phr. In preferred embodiments of the first and second embodiments, the at least one diene-based rubber of the first rubber layer includes a majority by weight in total (e.g., 51%, 55%, 60%, 65%, 70%, 75%, 80%, 855, 90%, 95%, or even 100%) of polybutadiene, polyisoprene, natural rubber, or mixtures thereof, and preferably no more than 10 parts in total (e.g., 10 parts, 5 parts, 4 parts, 3 parts, 2 parts, 1 part, or even 0 parts) of EPDM, butyl rubber, halogenated butyl rubber, or nitrile rubber. In more preferred embodiments of the foregoing, the at least one diene-based rubber of the first layer includes at least 60%, at least 70%, at least 80%, at least 90% or even 100% by weight of polybutadiene, polyisoprene, natural rubber, or mixtures thereof. In certain embodiments of the first and second embodiments, any polybutadiene that is used in the first layer is a high-cis polybutadiene, which can be considered to be a polybutadiene having a cis bond content of at least 90%, more preferably at least 92%. High-cis polybutadienes generally have Tgs that are relatively low, e.g., less than −100° C. In other embodiments of the first and second embodiments, any polybutadiene that is used in the first layer has a lower cis bond content, e.g., less than 90%, and a higher Tg, e.g., in the range of about-85 to about −55° C. or −85 to −55° C. (e.g., −85, −80, −75, −70, −65, −60, or −55° C.), preferably about-80 to about −60° C. or −80 to −60° C. (e.g., −60, −65, −70, −75, or −80° C.). In certain embodiments of the first and second embodiments, any polybutadiene rubber that is used in the first layer is not functionalized. In other embodiments of the first and second embodiments, any polybutadiene rubber that is used in the first layer is functionalized (e.g., by use of an end-functional compound and/or a coupling agent). In yet other embodiments of the first and second embodiments, a combination of functionalized polybutadiene and non-functionalized polybutadiene rubbers are used in the first rubber layer.

According to the first and second embodiments disclosed herein, the at least one filler of the first rubber layer may vary. In preferred embodiments of the first and second embodiments, the at least one filler of the first rubber layer includes carbon black, preferably in an amount of about 30 to about 50 phr or 30 to 50 phr (e.g., 30, 35, 40, 45, or 50 phr). When carbon black is used in the first rubber layer, e.g., in one of the foregoing amounts, the carbon black is preferably selected from N300 series, N500 series, or a combination thereof. Non-limiting examples of N300 series carbon blacks include N330 and N351. Non-limiting examples of N500 series carbon blacks include N550 carbon black, as designated by ASTM D-1765-82a. Any carbon black used in the first rubber layer is preferably a reinforcing carbon black, such as one having a surface area of at least about 20 $m^2/g$ (including at least 20 $m^2/g$) and, more preferably, at least about 35 $m^2/g$ up to about 200 $m^2/g$ or higher (including 35 $m^2/g$ up to 200 $m^2/g$). Surface area values used herein for carbon blacks are determined by ASTM D-1765 using the cetyltrimethyl-ammonium bromide (CTAB) technique. In preferred embodiments of the first and second embodiments, the first rubber layer includes a limited amount of silica (e.g., less than 5 phr, 4 phr, 3 phr, 2 phr, 1 phr), even more preferably no silica (i.e., 0 phr silica).

In preferred embodiments of the first and second embodiments, the cure package of the first rubber layer includes sulfur as a vulcanizing agent and at least one vulcanization accelerator with a weight ratio of vulcanization accelerator to sulfur of at least 0.7:1 (e.g., 0.7:1, 0.8:1, 0.9:1, 1:1, 1.1:1, 1.2:1, 1.3:1, 1.4:1, 1.5:1, 1.6:1, 1.7:1, etc.), preferably at least 0.9:1 or 0.9:1 to 1.5:1 (e.g., 0.9:1, 1:1, 1.1:1, 1.2:1, 1.3:1, 1.4:1, or 1.5:1). Examples of specific suitable sulfur vulcanizing agents include "rubbermaker's" soluble sulfur; sulfur donating curing agents, such as an amine disulfide, polymeric polysulfide, or sulfur olefin adducts; and insoluble polymeric sulfur. Preferably, the sulfur vulcanizing agent is soluble sulfur or a mixture of soluble and insoluble polymeric sulfur. The specific vulcanization accelerator or accelerators used in the cure package of the first rubber layer may vary. Generally, the sulfur vulcanizing agent(s) may be used in certain embodiments of the first and second embodiments in a total amount ranging from 1 to 12 phr (e.g., 1, 2, 3, 4, 5, 6, 7, 8, 9, 10, 11, or 12 phr), including from 3 to 10 phr (e.g., 3, 4, 5, 6, 7, 8, 9, or 10 phr), and 5 to 8 phr (e.g., 5, 6, 7, or 8 phr) and the at least one vulcanization accelerator may be used in a total amount ranging from 0.7 to 10 phr (e.g., 0.7, 1, 1.5, 2, 2.5, 3, 3.5, 4, 4.5, 5, 5.5, 6, 6.5, 7, 7.5, 8, 8.5, 9, 9.5, or 10 phr), including 1 or 8 phr (e.g., 1, 1.5, 2, 2.5, 3, 3.5, 4, 4.5, 5, 5.5, 6, 6.5, 7, 7.5, or 8 phr), with the weight ratio of vulcanization accelerator to sulfur being as discussed above. In preferred embodiments of the first and second embodiments, the at least one vulcanization accelerator used in the first rubber layer includes or is an ultra fast vulcanization accelerator. Generally, the following classes of vulcanization accelerators can be considered to be ultra-fast vulcanization accelerators: thiophosphates, thioureas, thiurams, dithiocarbamates, and xanthates. Non-limiting examples of a suitable thiophosphates include zinc-O,O-di-N-phosphorodithioate (ZBDP). Non-limiting examples of suitable thioureas include ethylene thiourea (ETU), di-pentamethylene thiourea (DPTU), and dibutyl thiourea (DBTU). Non-limiting examples of suitable thiurams include thiuram monosulfides and thiuram polysulfides (examples of which include TMTM (tetramethyl thiuram monosulfide), TMTD (tetramethyl thiuram disulfide), DPTT (dipentamethylene thiuram tetrasulfide), TETD (tetraethyl thiuram disulfide), TiBTD (tetraisobutyl thiuram disulfide), and TBzTD (tetrabenzyl thiuram disulfide)). Non-limiting examples of dithiocarbamates include zinc dimethyldithiocarbamate (ZDMC), zinc diethyldithiocarbamate (ZDEC), zinc dibutyldithiocarbamate (ZDBC), and zinc dibenzyldithiocarbamate (ZDBC). Non-limiting examples of a suitable xanthate includes zinc-isopropyl xanthate (ZIX).

The first rubber layer may also include one or more additional ingredients, including but not limited to, one or more plasticizers (e.g., liquid plasticizers such as oils or more solid plasticizers such as hydrocarbon resins), one or more antioxidants, one or more vulcanization activators (e.g., zinc oxide, stearic acid, and the like), one or more vulcanizing inhibitors, and one or more anti-scorching agents. According to the first and second embodiments disclosed herein, the first rubber layer may include any or all of the foregoing additional ingredients.

In those embodiments of the first and second embodiments where the first rubber layer includes one or more plasticizers, the particular type(s) and amount(s) of plasticizer(s) used may vary. Various plasticizers are suitable for use in the first rubber layer, including, but not limited to, liquid plasticizing agents such as oils and more solid plasticizing agents such as hydrocarbon resins. By stating that a plasticizing agent is liquid is meant to refer to its state at room temperature of 23° C. Any liquid plasticizer or oil may be present as an extender oil (used to extend one of the diene-based rubbers) and/or used as a free oil (added separately during mixing). Suitable liquid plasticizing agents such as oils include, but are not limited to, aromatic, naphthenic, and low PCA oils. Suitable low PCA oils include those having a polycyclic aromatic content of less than 3 percent by weight as determined by the IP346 method. Procedures for the IP346 method may be found in Standard Methods for Analysis & Testing of Petroleum and Related Products and British Standard 2000 Parts, 2003, 62nd edition, published by the Institute of Petroleum, United Kingdom. Suitable low PCA oils include mild extraction solvates (MES), treated distillate aromatic extracts (TDAE), TRAE, and heavy naphthenics. Suitable MES oils are available commercially as CATENEX SNR from SHELL, PROREX 15, and FLEXON 683 from EXXONMOBIL, VIVATEC 200 from BP, PLAXOLENE MS from TOTAL FINA ELF, TUDALEN 4160/4225 from DAHLEKE, MES-H from REPSOL, MES from Z8, and OLIO MES S201 from AGIP. Suitable TDAE oils are available as TYREX 20 from EXXONMOBIL, VIVATEC 500, VIVATEC 180, and ENERTHENE 1849 from BP, and EXTENSOIL 1996 from REPSOL. Suitable heavy naphthenic oils are available as SHELLFLEX 794, ERGON BLACK OIL, ERGON H2000, CROSS C2000, CROSS C2400, and SAN JOAQUIN 2000L. Suitable low PCA oils also include various plant-sourced oils such as can be harvested from vegetables, nuts, and seeds. Non-limiting examples include, but are not limited to, soy or soybean oil, sunflower oil (including high oleic sunflower oil), safflower oil, corn oil, linseed oil, cotton seed oil, rapeseed oil, cashew oil, sesame oil, camellia oil, jojoba oil, macadamia nut oil, coconut oil, and palm oil. The foregoing processing oils can be used as an extender oil, i.e., to prepare an oil-extended polymer or copolymer or as a processing or free oil. According to the first and second embodiments, the total amount of oil used (processing oil and any extender oil) in the first rubber layer is from about 1 to about 20 phr or 1 to 20 phr (e.g., 1, 5, 10, 15, or 20 phr), preferably about 1 to about 10 phr or 1 to 10 phr (e.g., 1, 2, 3, 4, 5, 6, 7, 8, 9, or 10 phr). Suitable hydrocarbon resins for use in the first rubber layer may vary and include but are not limited to cyclopentadiene or dicyclopentadiene homopolymer or copolymer resins; terpene homopolymer or copolymer resins; phenol homopolymer or copolymer resins; C5 or C9 fraction homopolymer or copolymer resins; alpha-methylstyrene homopolymer or copolymer resins, and combinations thereof. According to the first and second embodiments, the total amount of hydrocarbon resin used in the first rubber layer is about 1 to about 10 phr or 1 to 10 phr (e.g., 1, 2, 3, 4, 5, 6, 7, 8, 9, or 10 phr), preferably about 1 to about 5 phr or 1 to 5 phr (e.g., 1, 2, 3, 4, or 5 phr). In preferred embodiments of the first and second embodiments, the total amount of plasticizing agent is no more than 10 phr (e.g., 10, 9, 8, 7, 6, 5, 4 phr or less), including no more than 5 phr, etc.

In those embodiments of the first and second embodiments where the first rubber layer includes one or more antioxidants, the particular type(s) and amount(s) used may vary. Various antioxidants are known to those of skill in the art and may be utilized in the first rubber layer, including but not limited to certain waxes, phenolic antioxidants, amine phenol antioxidants, hydroquinone antioxidants, alkyldiamine antioxidants, and amine compound antioxidants such as N-phenyl-N'-isopropyl-p-phenylenediamine (IPPD), or N-(1,3-dimethylbutyl)-N'-phenyl-phenylenediamine (6PPD). One or more than one type as well as one or more than one of each type may be utilized in certain embodiments. Generally, the total amount of antioxidant(s) used in the first layer is 1 to 5 phr (e.g., 1, 2, 3, 4, or 5 phr).

In those embodiments of the first and second embodiments where the first rubber layer includes one or more vulcanization activators, the particular type(s) and amount(s) used may vary. Generally, vulcanization activators are additives used to support vulcanization and include both an inorganic and organic component. Zinc oxide is the most widely used inorganic vulcanization activator. Various organic vulcanization activators are commonly used including stearic acid, palmitic acid, lauric acid, and zinc salts of each of the foregoing. Generally, the total amount of vulcanization activator used ranges from 0.1 to 6 phr (e.g., 0.1, 0.5, 1, 1.5, 2, 2.5, 3, 3.5, 4, 4.5, 5, 5.5, or 6 phr), preferably 0.5 to 4 phr (e.g., 0.5, 1, 1.5, 2, 2.5, 3, 3.5, or 4 phr), preferably from a combination of zinc oxide and stearic acid.

In those embodiments of the first and second embodiments where the first rubber layer includes one or more vulcanization inhibitors, the particular vulcanization inhibitor(s) used and amount(s) may vary. Generally, vulcanization inhibitors are used to control the vulcanization process and retard or inhibit vulcanization until the desired time and/or temperature is reached. Common vulcanization inhibitors include, but are not limited to, PVI (cyclohexylthiophthalmide) from Santogard. Generally, the amount of vulcanization inhibitor is 0.1 to 3 phr (e.g., 0.1, 0.5, 1, 1.5, 2, 2.5, or 3 phr), preferably 0.5 to 2 phr (e.g., 0.5, 1, 1.5, or 2 phr).

In those embodiments of the first and second embodiments where the first rubber layer includes one or more anti-scorching agents, the particular type(s) and amount(s) used may vary. For a general disclosure of suitable anti-scorching (as well as other components used in curing), one can refer to Kirk-Othmer, Encyclopedia of Chemical Technology, 3rd ed., Wiley Interscience, N.Y. 1982, Vol. 20, pp. 365 to 468, particularly Vulcanization Agents and Auxiliary Materials, pp. 390 to 402, or Vulcanization by A. Y. Coran, Encyclopedia of Polymer Science and Engineering, Second Edition (1989 John Wiley & Sons, Inc.), both of which are incorporated herein by reference.

Second Rubber Layer

As mentioned above, according to the first and second embodiments, the radio device is positioned between a first rubber layer and a second rubber layer. The T50 cure time of the second rubber layer (T50-2) is greater than the T50 cure time of the first rubber layer (T50-1). The second rubber layer is comprised of 100 parts of at least one diene-based rubber, at least one filler and a cure package. As used herein, the phrase diene-based rubber is intended to refer to polymers or copolymers which are made from at least one type of conjugated diene monomer. Generally, non-limiting examples of diene-based rubbers include natural rubber, polyisoprene, styrene-butadiene rubber, and polybutadiene. The particular ingredients used for the at least one diene based rubber, at least one filler, and cure package of the second rubber layer may vary, but are selected so as to cause the T50-2 cure time to be about 2.5 to about 5 minutes or 2.5 to 5 minutes (e.g., 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, or 5 minutes), preferably about 3 to about 4 minutes or 3 to 4 minutes (e.g., 3, 3.1, 3.2, 3.3, 3.4, 3.5, 3.6, 3.7, 3.8, 3.9, or 4 minutes).

In certain embodiments of the first and second embodiments, the first rubber layer will meet at least one of the following: (a) an elongation at break at 23° C. of at least 300% (e.g., 300%, 350%, 400%, 450%, 500%, 550%, 600%, 650%, 700%, 750%, 800%, 850%, etc.), preferably about 400% to about 700% or 400% to 700% (e.g., 400%, 450%, 500%, 550%, 600%, 650%, or 700%); (b) a 50% modulus at 23° C. of at least 6 MPa (e.g., 6 MPa, 7 MPa, 8 MPa, 9 MPa, 10 MPa, 11 MPa, 12 MPa, etc.), preferably about 7 MPa to about 10 MPa or 7 MPa to 10 MPa (e.g., 7 MPa, 8 MPa, 9 MPa, or 10 MPa); (c) a tension at break at 23° C. of at least 12 MPa (e.g., 12 MPa, 14 MPa, 16 MPa, 18 MPa, 20 MPa, 22 MPa, etc.), preferably about 14 MPa to about 20 MPa or 14 MPa to 20 MPa (e.g., 14 MPa, 15 MPa, 16 MPa, 17 MPa, 18 MPa, 19 MPa, or 20 MPa); or (d) a Mooney viscosity ML1+4 at 130° C. of about 46 to about 60 or 46 to 60 (e.g., 46, 48, 50, 52, 54, 56, 58, or 60), preferably about 50 to about 55 or 50 to 55 (e.g., 50, 51, 52, 53, 54, or 55).

Elongation at break and tension at break can be measured following the guidelines of, but not restricted to, the standard procedure described in ASTM D-412, with dumbbell-shaped samples having a cross-section dimension of 4 mm in width and 1.9 mm in thickness at the center. During measurement, specimens may be strained at a constant rate (20% per second) and the resulting force recorded as a function of extension (strain). Eb and Tb taken at 23° C. are sometimes referred to as room temperature measurements. A 50% modulus measurement (in terms of MPa) is also referred to as M50 and measures tensile stress of a sample of the rubber composition at 50% elongation. The 50% modulus measurement is not a true modulus measurement and can be measured using same method described for Eb and Tb. The Mooney viscosity ML1+4 at 130° C. can be determined using an Alpha Technologies Mooney viscometer with a large rotor, a one minute warm-up time, and a four minute running time, and, hence is referred to as Mooney1+4 or ML1+4. More specifically, such Mooney viscosities are measured by preheating an uncured sample to 130° C. for one minute before the rotor starts, and the Mooney viscosity is recorded for each sample as the torque at four minutes after the rotor is started.

In certain embodiments of the first and second embodiments, the second layer has a shore A hardness at 23° C. of less than 60 (e.g., 60, 59, 58, 57, 56, 55, 54, 53, 52, 51, 50, 49, 48, 47, etc.), preferably about 50 to about 55 or 50 to 55 (e.g., 50, 51, 52, 53, 54, or 55). The shore A hardness can be determined according to ASTM D2240, with a sample size having a minimum 0.25 inch gauge and 1 inch width, and curing conditions of 40 minutes at 150° C.

In preferred embodiments of the first and second embodiments, the second rubber layer meets each of the foregoing (a)-(d), more preferably each of (a)-(d) in their preferable ranges; in certain such embodiments, the second rubber layer also meets the shore A hardness value, preferably in the preferred range.

According to the first and second embodiments disclosed herein, the rubber or rubbers used to comprise the 100 parts of at least one diene-based rubber in the second rubber layer may vary. In preferred embodiments of the first and second embodiments, the at least one diene-based rubber of the second rubber layer includes a majority by weight in total (e.g., 51%, 60%, 70%, 80%, 90%, or even 100%) of polyisoprene, natural rubber, styrene-butadiene rubber or mixtures thereof, and preferably no more than 10 parts in total (e.g., 10 parts, 5 parts, or even 0 parts) of EPDM, butyl rubber, halogenated butyl rubber, or nitrile rubber. In more preferred embodiments of the foregoing, the at least one diene-based rubber of the second layer includes at least 60%, at least 70%, at least 80%, at least 90% or even 100% by weight of polyisoprene, natural rubber, styrene-butadiene rubber, or mixtures thereof. In certain embodiments of the first and second embodiments, any styrene-butadiene rubber that is used in the second layer is not functionalized. In other less preferred embodiments of the first and second embodiments, any styrene-butadiene rubber that is used in the second layer is functionalized (e.g., by use of an end-functional compound and/or a coupling agent).

According to the first and second embodiments disclosed herein, the at least one filler of the second rubber layer may vary. In preferred embodiments of the first and second embodiments, the at least one filler of the first rubber layer includes carbon black, silica, or a mixture thereof, preferably in total amount of about 30 to about 50 phr or 30 to 50 phr (e.g., 30, 35, 40, 45, or 50 phr). When carbon black is used in the second rubber layer, e.g., in one of the foregoing amounts, the carbon black is preferably a reinforcing carbon black, such as one having a surface area of at least about 20 $m^2/g$ (including at least 20 $m^2/g$) and, more preferably, at least about 35 $m^2/g$ up to about 100 $m^2/g$ or higher (including 35 $m^2/g$ up to 100 $m^2/g$ and values falling therein such as 35, 40, 45, 50, 55, 60, 65, 70, 75, 80, 85, 90, 95, or 100 $m^2/g$). Surface area values used herein for carbon blacks are determined by ASTM D-1765 using the cetyltrimethylammonium bromide (CTAB) technique. When silica is used in the second rubber layer, the silica preferably has a nitrogen surface area of no more than 200 m² g and is limited to no more than 30% by weight of the total filler (e.g., 30%, 25%, 20%, 15%, 10% or less), including no more than 20% by weight of the total filler and no more than 10% by weight of the total filler.

In preferred embodiments of the first and second embodiments, the cure package of the second rubber layer includes sulfur as a vulcanizing agent and at least one vulcanization accelerator with a weight ratio of vulcanization accelerator to sulfur of no more than 0.6:1 (e.g., 0.6:1, 0.5:1, 0.4:1, 0.3:1, or less), preferably no more than 0.5:1 (e.g., 0.5:1, 0.45:1, 0.4:1, 0.35:1, 0.3:1, or less), more preferably no more than 0.4:1 (e.g., 0.4:1, 0.35:1, 0.3:1, or less). Particular weight ratios within the foregoing include, but are not limited to, 0.6:1, 0.55:1, 0.5:1, 0.45:1, 0.4:1, 0.35:1, 0.3:1, 0.25:1, 0.2:1, 0.15:1 and 0.1:1. Examples of specific suitable sulfur vulcanizing agents for the second rubber layer include "rubbermaker's" soluble sulfur; sulfur donating curing agents, such as an amine disulfide, polymeric polysulfide, or sulfur olefin adducts; and insoluble polymeric sulfur. Preferably, the sulfur vulcanizing agent is soluble sulfur or a mixture of soluble and insoluble polymeric sulfur. The specific vulcanization accelerator or accelerators used in the cure package of the second rubber layer may vary. In certain embodiments of the first and second embodiments, the at least one vulcanization accelerator of the second rubber layer includes a sulfenamide, a thiazole, or a combination thereof. In preferred embodiments of the first and second embodiment, the at least one vulcanization accelerator of the second rubber layer includes a sulfenamide. Non-limiting examples of sulfenamide-type vulcanization accelerators include N-cyclohexyl-2-benzothiazole-sulfenamide (CBS), N-tert-butyl-2-benzothiazole-sulfenamide (TBBS), 2-(4-morpholinothio)-benzothiazole (MBS), and N,N'-dicyclohexyl-2-benzothiazolsulfenamide (DCBS). Non-limiting examples of suitable thiazoles include 2-mercaptobenzothiazole (MBT), 2,2'-dithiobis(benzothiazole) (MBTS), and N-tert-butyl-2-benzothiazole-sulfenamide (TBBS). Generally, the sulfur vulcanizing agent(s) may be used in certain embodiments of the first and second embodiments in a total amount ranging from 0.5 to 8 phr, including from 1 to 6 phr, and 2 to 5 phr and the at least one vulcanization accelerator may be used in a total amount ranging from 0.3 to 5 phr, including 0.6 or 4 phr, with the weight ratio of vulcanization accelerator to sulfur being as discussed above. In preferred embodiments of the first and second embodiments, the at least one vulcanization accelerator used in the second rubber layer does not include (i.e., excludes) any ultra fast vulcanization accelerators. Classes of ultra-fast vulcanization accelerators are discussed in detail above, with respect to the first rubber layer.

The second rubber layer may also include one or more additional ingredients, including but not limited to, one or more plasticizers (e.g., liquid plasticizers such as oils or more solid plasticizers such as hydrocarbon resins), one or more antioxidants, one or more vulcanization activators (e.g., zinc oxide, stearic acid, and the like), one or more vulcanizing inhibitors, and one or more anti-scorching agents. According to the first and second embodiments disclosed herein, the second rubber layer may include any or all of the foregoing additional ingredients.

In those embodiments of the first and second embodiments where the second rubber layer includes one or more plasticizers, the particular type(s) and amount(s) used may vary. Various plasticizers are suitable for use in the second rubber layer, including, but not limited to, liquid plasticizing agents such as oils and more solid plasticizing agents such as hydrocarbon resins. By stating that a plasticizing agent is liquid is meant to refer to its state at room temperature of 23° C. Any liquid plasticizer or oil may be present as an extender oil (used to extend one of the diene-based rubbers) and/or used as a free oil (added separately during mixing). Suitable liquid plasticizing agents such as oils include, but are not limited to, aromatic, naphthenic, and low PCA oils. Suitable low PCA oils include those having a polycyclic aromatic content of less than 3 percent by weight as determined by the IP346 method. Procedures for the IP346 method may be found in Standard Methods for Analysis & Testing of Petroleum and Related Products and British Standard 2000 Parts, 2003, 62nd edition, published by the Institute of Petroleum, United Kingdom. Suitable low PCA oils include mild extraction solvates (MES), treated distillate aromatic extracts (TDAE), TRAE, and heavy naphthenics. Suitable MES oils are available commercially as CATENEX SNR from SHELL, PROREX 15, and FLEXON 683 from EXXONMOBIL, VIVATEC 200 from BP, PLAXOLENE MS from TOTAL FINA ELF, TUDALEN 4160/4225 from DAHLEKE, MES-H from REPSOL, MES from Z8, and OLIO MES S201 from AGIP. Suitable TDAE oils are available as TYREX 20 from EXXONMOBIL, VIVATEC 500, VIVATEC 180, and ENERTHENE 1849 from BP, and EXTENSOIL 1996 from REPSOL. Suitable heavy naphthenic oils are available as SHELLFLEX 794, ERGON BLACK OIL, ERGON H2000, CROSS C2000, CROSS C2400, and SAN JOAQUIN 2000L. Suitable low PCA oils also include various plant-sourced oils such as can be harvested from vegetables, nuts, and seeds. Non-limiting examples include, but are not limited to, soy or soybean oil, sunflower oil (including high oleic sunflower oil), safflower oil, corn oil, linseed oil, cotton seed oil, rapeseed oil, cashew oil, sesame oil, camellia oil, jojoba oil, macadamia nut oil, coconut oil, and palm oil. The foregoing processing oils can be used as an extender oil, i.e., to prepare an oil-extended polymer or copolymer or as a processing or free oil. According to the first and second embodiments, the total amount of oil used (processing oil and any extender oil) in the second rubber layer is from about 1 to about 30 phr or 1 to 30 phr (e.g., 1, 5, 10, 15, 20, 25, or 30 phr), preferably about 5 to about 20 phr or 5 to 20 phr (e.g., 5, 10, 5 or 20 phr). Suitable hydrocarbon resins for use in the second rubber layer may vary and include but are not limited to cyclopentadiene or dicyclopentadiene homopolymer or copolymer resins; terpene homopolymer or copolymer resins; phenol homopolymer or copolymer resins; C5 or C9 fraction homopolymer or copolymer resins; alpha-methylstyrene homopolymer or copolymer resins, and combinations thereof. According to the first and second embodiments, the total amount of hydrocarbon resin used in the first second layer is about 1 to about 10 phr or 1 to 10 phr (e.g., 1, 2, 3, 4, 5, 6, 7, 8, 9, or 10 phr), preferably about 1 to about 5 phr, 1 to 5 phr (e.g., 1, 2, 3, 4, or 5 phr), more preferably about 1 to about 3 phr or 1 to 3 phr (e.g., 1, 1.5, 2, 2.5, or 3 phr). In preferred embodiments of the first and second embodiments, the total amount of plasticizing agent is no more than 25 phr (e.g., 25, 20, 15, 10, 5, or even 0 phr), including no more than 20 phr, no more than 15 phr, etc.

In those embodiments of the first and second embodiments where the second rubber layer includes one or more antioxidants, the particular type(s) and amount(s) used may vary. Various antioxidants are known to those of skill in the art and may be utilized in the second rubber layer, including but not limited to certain waxes, phenolic antioxidants, amine phenol antioxidants, hydroquinone antioxidants, alkyldiamine antioxidants, and amine compound antioxidants such as N-phenyl-N'-isopropyl-p-phenylenediamine (IPPD), or N-(1,3-dimethylbutyl)-N'-phenyl-phenylenediamine (6PPD). One or more than one type as well as one or more than one of each type may be utilized in certain embodiments. Generally, the total amount of antioxidant(s) used is 1 to 5 phr (e.g., 1, 2, 3, 4, or 5 phr).

In those embodiments of the first and second embodiments where the second rubber layer includes one or more vulcanization activators, the particular vulcanization activator(s) used and amount(s) may vary. Generally, vulcanization activators are additives used to support vulcanization and include both an inorganic and organic component. Zinc oxide is the most widely used inorganic vulcanization activator. Various organic vulcanization activators are commonly used including stearic acid, palmitic acid, lauric acid, and zinc salts of each of the foregoing. Generally, the total amount of vulcanization activator used in the second rubber layer ranges from 0.1 to 8 phr (e.g., 0.1, 0.5, 1, 1.5, 2, 2.5, 3, 3.5, 4, 4.5, 5, 5.5, 6, 6.5, 7, 7.5, or 8 phr), preferably 1 to 6 phr (e.g., 1, 1.5, 2, 2.5, 3, 3.5, 4, 4.5, 5, 5.5, or 6 phr), preferably from a combination of zinc oxide and stearic acid.

In those embodiments of the first and second embodiments where the second rubber layer includes one or more vulcanization inhibitors, the particular vulcanization inhibitor(s) used and amount(s) may vary. Generally, vulcanization inhibitors are used to control the vulcanization process and retard or inhibit vulcanization until the desired time and/or temperature is reached. Common vulcanization inhibitors include, but are not limited to, PVI (cyclohexylthiophthalmide) from Santogard. Generally, the amount of vulcanization inhibitor is 0.1 to 3 phr (e.g., 0.1, 0.5, 1, 1.5, 2, 2.5, or 3 phr), preferably 0.5 to 2 phr (e.g., 0.5, 1, 1.5, or 2 phr).

In those embodiments of the first and second embodiments where the second rubber layer includes one or more anti-scorching agents, the particular type(s) and amount(s) used may vary. For a general disclosure of suitable anti-scorching (as well as other components used in curing), one can refer to Kirk-Othmer, Encyclopedia of Chemical Technology, 3rd ed., Wiley Interscience, N.Y. 1982, Vol. 20, pp. 365 to 468, particularly Vulcanization Agents and Auxiliary Materials, pp. 390 to 402, or Vulcanization by A. Y. Coran, Encyclopedia of Polymer Science and Engineering, Second Edition (1989 John Wiley & Sons, Inc.), both of which are incorporated herein by reference.

Formation of the Rubber Layers

Each of the rubber layers (i.e., the first rubber layer and the second rubber layer) will generally be prepared according to conventionally practiced methods comprising mixing the ingredients in at least one non-productive master-batch stage and a final productive mixing stage. In certain embodiments of the first and second embodiments, each rubber layer is prepared by combining the ingredients of its applicable rubber composition (as disclosed above) by methods known in the art, such as, for example, by kneading the ingredients together in a Banbury mixer or on a milled roll. Such methods generally include at least one non-productive master-batch mixing stage and a final productive mixing stage. The term non-productive master-batch stage is known to those of skill in the art and generally understood to be a mixing stage (or stages) where no vulcanizing agents or vulcanization accelerators are added. The term final productive mixing stage is also known to those of skill in the art and generally understood to be the mixing stage where the vulcanizing agents and vulcanization accelerators are added into the rubber composition. In certain embodiments of the first and second embodiments, one or both of the rubber layers are prepared from a rubber composition that has been prepared by a process comprising more than one non-productive master-batch mixing stage.

Generally, the rubbers (or polymers) and filler will be added in a non-productive or master-batch mixing stage or stages. Generally, at least the vulcanizing agent component and the vulcanizing accelerator component of a cure package will be added in a final or productive mixing stage.

In certain embodiments of the first and second embodiments, one or both of the rubber layers are prepared from a rubber composition that has been prepared using a process wherein at least one non-productive master batch mixing stage conducted at a temperature of about 130° C. to about 200° C. In certain embodiments of the first and second embodiments, one or both of the rubber layers are prepared from a rubber composition that has been prepared using a final productive mixing stage conducted at a temperature below the vulcanization temperature in order to avoid unwanted pre-cure of the rubber composition. Therefore, the temperature of the productive or final mixing stage generally should not exceed about 120° C. and is typically about 40° C. to about 120° C., or about 60° C. to about 110° C. and, especially, about 75° C. to about 100° C. In certain embodiments of the first and second embodiments, one or both of the rubber layer are prepared from a rubber composition that has been prepared according to a process that includes at least one non-productive mixing stage and at least one productive mixing stage.

Once the ingredients for a rubber layer have been prepared such as according to the above-described mixing procedure, a layer can be formed therefrom. Various methods are suitable for forming the rubber layers, including, but not limited to, calendaring or an extrusion process. In preferred embodiments of the first and second embodiment, the first and second rubber layers are both formed by calendaring. As those of skill in the art will understand, calendaring is a process whereby rubber is moved through a series of rolls (some of which may be heated) including rolls that are arranged in pairs to produce a rubber layer such as the first and/or second rubber layers discussed herein. As those of skill in the art will also understand, various forms of extrusion may be suitable for use in forming the first and/or second rubber layers discussed herein, non-limiting types of which include roller die extrusion.

As mentioned above, according to the first and second embodiments, the first and second rubber layers each independently have a thickness of about 0.4 to about 3 mm or 0.4 to 3 mm (e.g., 0.4, 0.5, 0.6, 0.7, 0.8, 0.9, 1, 1.5, 2, 2.5, or 3 mm), preferably about 0.5 to about 2 mm or 0.5 to 2 mm (e.g., 0.5, 0.6, 0.7, 0.8, 0.9, 1, 1.5, or 2 mm).

Positioning of the Radio Device Within the Tire

As mentioned above, when an electronic communication module which includes a radio device is incorporated into a tire, the particular location or mounting configuration may vary. Generally, the radio device will be placed into an uncured tire only after it has been positioned between the first rubber layer and the second rubber layer, with both rubber layers being uncured. Curing of the first and second rubber layers will take place during curing of the overall tire. In its uncured state, the tire including any of its components such as an inner liner, one or more body plies, carcass ply, bead, and bead filler can be considered to be an uncured tire carcass. When described as being located within a cured tire, both the first and second rubber layers between which the radio device is positioned will also be cured.

In preferred embodiments of the first and second embodiments, the enclosed radio device (i.e., the radio device positioned between a first rubber layer and a second rubber layer) is positioned against the tire inner liner. According to such an embodiment, the tire includes an inner liner and the radio device (positioned between a first rubber layer and a second rubber layer) is positioned radially inward of the inner liner with the second rubber layer against the inner liner and the first rubber layer facing radially inward or not against the inner liner.

Alternative positioning of the enclosed radio device within a tire may also be possible. For example, in certain embodiments, the tire includes at least one body ply as well as a bead and bead filler (in addition to the inner liner), and the enclosed radio device is positioned such that the first rubber layer is against the body ply and the second rubber layer faces radially outward. According to such embodiments, the enclosed ratio device positioned against the body ply may be along a portion of the body ply which covers the bead filler or alternatively along a portion of the body ply which is above the bead filler.

Curing of the Tire

According to the second embodiment provided herein, a method is provided for curing a tire with an electronic communication module. The method of the second embodiment can also be understood as a method for providing a tire with an electronic communication module according to the first embodiment or a method for curing a tire according to the first embodiment. (The first embodiment disclosed herein, i.e., a tire having an electronic communication module including a radio device positioned between a first rubber layer and a second rubber layer, is intended to encompass the tire in uncured form as well as the tire in cured form.) According to the process of the second embodiment, an uncured tire carcass and an electronic communication module including an enclosed radio device positioned between a first rubber layer and a second rubber layer are provided. The first rubber layer is comprised of 100 parts of at least one diene-based rubber, at least one filler, and a cure package and the first rubber layer has a T50 cure time T50-1 at 160° C. of about 1.5 to about 3.5 minutes, preferably about 2 to about 3 minutes. The second rubber layer is comprised of at least one diene-based rubber, at least one filler, and a cure package, and the second rubber layer has a T50 cure time T50-2 at 160° C. that is greater than T50-1 and is about 2.5 to about 5 minutes, preferably about 3 to about 4 minutes. According to the second embodiment, the first and second rubber layers each independently have a thickness of about 0.4 to about 3 mm or 0.4 to 3 mm (e.g., 0.4, 0.5, 0.6, 0.7, 0.8, 0.9, 1, 1.5, 2, 2.5, or 3 mm), preferably about 0.5 to about 2 mm or 0.5 to 2 mm (e.g., 0.5, 0.6, 0.7, 0.8, 0.9, 1, 1.5, or 2 mm). Further according to the process of the second embodiment, the enclosed radio device (i.e., the radio device that is positioned between the first and second rubber layers) is positioned against at least one component of the uncured tire carcass, and then the uncured tire carcass is cured together with the enclosed radio device. As discussed in more detail infra, the at least one component of the uncured tire carcass against which the enclosed radio device is positioned may be chosen from various components including an inner liner or a body ply, preferably an inner liner.

As those of skill in the art will understand, the particular details of the curing of the uncured tire carcass and the positioned enclosed radio device may vary according to factors such as the weight and thickness of the uncured tire carcass. In certain embodiments of the second embodiment, the process of curing takes place at a temperature sufficient to raise the internal temperature of the tire to about 135 to about 165° C. or 135 to 165° C. (e.g., 135, 140, 145, 150, 155, 160, or 165° C.), particularly in embodiments where the uncured tire carcass is for a truck or bus radial tire. In other embodiments of the second embodiment, the process of curing takes place at a temperature sufficient to raise the internal temperature of the tire to about 160 to about 180° C. or 160 to 180° C. (e.g., 160, 165, 170, 175, or 180° C.), particularly when the uncured tire carcass is for a passenger car tire. The internal tire temperature may be achieved by the use of various services (e.g., steam or hot water) which are used in the process of curing. In certain embodiments of the second embodiment, the internal temperature of the service is about 190 to 210° C. or 190 to 210° C. (e.g., 190, 195, 200, 205, or 210° C.) and/or the external temperature of the service is about 140 to about 165° C. or 140 to 165° C. (e.g., 140, 145, 150, 155, 160, or 165° C.). In certain embodiments of the second embodiment, the process of curing also takes place under pressure with exemplary pressures including about 1.6 to about 2.7 MPa (e.g., 1.6, 1.7, 1.8, 1.9, 2, 2.1, 2.2, 2.3, 2.4, 2.5, 2.6, or 2.7 MPa).

In certain embodiments of the second embodiment, the process of curing makes use of a pebble-surface rubber curing bladder. Generally, the overall process of curing an uncured tire carcass will include the use of a tire curing apparatus (e.g., a tire press) which cure or vulcanize the uncured tire carcass by applying both internal and external heat and pressure. A tire press generally uses a heated outer metal mold that serves to shape and vulcanize the outside of the tire and is often used in conjunction with a rubber curing bladder that is inflated in the inside of the tire carcass and heated to vulcanize the interior of the tire. The use of a pebble-surface rubber curing bladder in the processes of the second embodiment can be useful in preventing cracks due to the pebble-grained surface allowing escape of air from between the inner surface of the green (uncured tire carcass) and the curing bladder. Air that is trapped could otherwise lead to cracks along the edge of the radio device or RFID during curing which may case stress concentration areas that may adversely impact durability. According to such an embodiment, the pebble surface will be present on the outer surface of the curing bladder which is the surface that contacts the tire during inflation and curing.

During the process of curing an uncured tire carcass, a release treatment may be applied to the surface of the inner liner (or alternatively to the radially innermost component of the uncured tire carcass) prior to curing in order to avoid sticking or co-curing of the inner liner to the curing bladder during the curing process. Various release treatments are known to be useful for such purposes including, but not limited to, silicone lubricants and polysiloxane-containing release treatments. In certain embodiments of the first and second embodiments disclosed herein, the area of the tire component (e.g., inner liner or body ply) to which the enclosed radio device is positioned against will be free of release treatment. Having this area of the tire component free of release treatment (prior to positioning the enclosed radio device) can be useful in preventing undesirable bonding with the tire component (e.g., the inner liner). The presence of release treatment in the area of the tire component to which the enclosed radio device is positioned and any resulting bonding (e.g., to the inner liner) can lead to cracks along the edge of the radio device or RFID that may adversely impact durability.

This application discloses several numerical range limitations that support any range within the disclosed numerical ranges, even though a precise range limitation may not be stated verbatim in the specification, because the embodiments of the compositions and methods disclosed herein could be practiced throughout the disclosed numerical ranges. With respect to the use of substantially any plural or singular terms herein, those having skill in the art can translate from the plural to the singular or from the singular to the plural as is appropriate to the context or application. The various singular or plural permutations may be expressly set forth herein for sake of clarity.

It will be understood by those within the art that, in general, terms used herein, and especially in the appended claims are generally intended as "open" terms. For example, the term "including" should be interpreted as "including but not limited to," the term "having" should be interpreted as "having at least," the term "includes" should be interpreted as "includes but is not limited to." It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." All references, including but not limited to patents, patent applications, and non-patent literature are hereby incorporated by reference herein in their entirety. While various aspects and embodiments of the compositions and methods have been disclosed herein, other aspects and embodiments will be apparent to those skilled in the art. The various aspects and embodiments disclosed herein are for purposes of illustration and are not intended to be limiting, with the true scope and spirit being indicated by the claims.

What is claimed is:

1. A tire having an electronic communication including a radio device positioned between a first rubber layer and a second rubber layer,
   wherein the first rubber layer is comprised of 100 parts of at least one diene-based rubber, at least one filler, and a cure package and the first rubber layer has a T50 cure time T50-1 at 160° C. of about 1.5 to about 3.5 minutes,
   wherein the second rubber layer is comprised of at least one diene-based rubber, at least one filler, and a cure package, and the second rubber layer has a T50 cure time T50-2 at 160° C. that is greater than T50-1 and is about 2.5 to about 5 minutes,
   wherein the first and second rubber layers each independently have a thickness of about 0.4 to about 3 mm,
   wherein the 100 parts of the at least one diene-based rubber of the first rubber layer includes a majority by weight of polybutadiene, polyisoprene, natural rubber, or mixtures thereof, and no more than 10 parts in total of EPDM, butyl rubber, halogenated butyl rubber, or nitrile rubber, and the 100 parts of the at least one diene-based rubber of the second rubber layer includes a majority by weight of polyisoprene, natural rubber, styrene-butadiene rubber, or mixtures thereof, and no more than 10 parts in total of EPDM, butyl rubber, halogenated butyl rubber, or nitrile rubber,
   wherein the at least one filler of the first rubber layer includes about 30 to about 50 phr of carbon black, and the at least one filler of the second rubber layer includes about 30 to about 50 phr of at least one filler selected from carbon black, silica, and mixtures thereof,
   wherein the cure package of the first rubber layer includes sulfur as a vulcanizing agent and at least one vulcanization accelerator with a weight ratio of vulcanization accelerator to sulfur of 0.7:1 to 1.5:1, and the cure package of the second rubber layer includes sulfur as a vulcanizing agent and at least one vulcanization accelerator with a weight ratio of vulcanization accelerator to sulfur of no more than 0.6:1, and
   wherein the tire includes an inner liner and the radio device is positioned radially inward of the inner liner with the second layer against the inner liner and the first rubber layer facing radially inward,
   wherein the first rubber layer meets each of the following:
   a. an elongation at break at 23° C. of less than 150%;
   b. a 50% modulus at 23° C. of about 3.5 MPa to about 6 MPa;
   c. a tension at break at 23° C. of about 9 MPa to about 15 MPa; or
   d. a Mooney viscosity ML1+4 at 130° C. of about 43 to about 57, and wherein the second rubber layer meets each of the following:
   e. an elongation at break at 23° C. of at least 300%;
   f. a 50% modulus at 23° C. of about 6 MPa to about 10 MPa;
   g. a tension at break at 23° C. of about 12 MPa to about 20 MPa; or
   h. a Mooney viscosity ML1+4 at 130° C. of about 46 to about 60.

2. The tire of claim 1, wherein the first rubber layer has a T50 cure time T50-1 of about 2 minutes to about 3 minutes, and second rubber layer has a T50 cure time T50-2 of about 3 to about 4 minutes.

3. A tire having an electronic communication including a radio device positioned between a first rubber layer and a second rubber layer, wherein the first rubber layer is comprised of 100 parts of at least one diene-based rubber, at least one filler, and a cure package and the first rubber layer has a T50 cure time T50–1 at 160° C. of about 1.5 to about 3.5 minutes, wherein the second rubber layer is comprised of at least one diene-based rubber, at least one filler, and a cure package, and the second rubber layer has a T50 cure time T50–2 at 160° C. that is greater than T50–1 and is about 2.5 to about 5 minutes, wherein the first and second rubber layers each independently have a thickness of about 0.4 to about 3 mm, wherein the tire includes an inner liner and the radio device is positioned radially inward of the inner liner with the second layer against the inner liner and the first rubber layer facing radially inward, wherein the first rubber layer meets each of the following:
a. an elongation at break at 23° C. of less than 150%;
b. a 50% modulus at 23° C. of about 3.5 MPa to about 6 MPa;
c. a tension at break at 23° C. of about 9 MPa to about 15 MPa; or
d. a Mooney viscosity ML1+4 at 130° C. of about 43 to about 57, and wherein the second rubber layer meets each of the following:
e. an elongation at break at 23° C. of at least 300%;
f. a 50% modulus at 23° C. of about 6 MPa to about 10 MPa;
g. a tension at break at 23° C. of about 12 MPa to about 20 MPa; or
h. a Mooney viscosity ML1+4 at 130° C. of about 46 to about 60.

4. The tire of claim 3, wherein the 100 parts of the at least one diene-based rubber of the first rubber layer includes a majority by weight of polybutadiene, polyisoprene, natural rubber, or mixtures thereof, and no more than 10 parts in total of EPDM, butyl rubber, halogenated butyl rubber, or nitrile rubber, and wherein the 100 parts of the at least one diene-based rubber of the second rubber layer includes a majority by weight of polyisoprene, natural rubber, styrene-butadiene rubber, or mixtures thereof, and no more than 10 parts in total of EPDM, butyl rubber, halogenated butyl rubber, or nitrile rubber.

5. The tire of claim 3, wherein the at least one filler of the first rubber layer includes about 30 to about 50 phr of carbon black, and the at least one filler of the second rubber layer includes about 30 to about 50 phr of at least one filler selected from carbon black, silica, and mixtures thereof.

6. The tire of claim 3, wherein the cure package of the first rubber layer includes sulfur as a vulcanizing agent and at least one vulcanization accelerator with a weight ratio of vulcanization accelerator to sulfur of 0.7:1 to 1.5:1, and the cure package of the second rubber layer includes sulfur as a vulcanizing agent and at least one vulcanization accelerator with a weight ratio of vulcanization accelerator to sulfur of no more than 0.6:1.

7. The tire of claim 1, wherein the inner liner is the radially innermost component of the tire.

8. A method for curing a tire with an electronic communication module, the method comprising
providing an uncured tire carcass and an electronic communication module including an enclosed radio device positioned between a first rubber layer and a second rubber layer,
wherein the first rubber layer is comprised of 100 parts of at least one diene-containing rubber, at least one filler, and a cure package and the first rubber layer has a T50 cure time T50–1 at 160° C. of about 1.5 to about 3.5 minutes, wherein the second rubber layer is comprised of at least one diene-containing rubber, at least one filler, and a cure package, and the second rubber layer has a T50 cure time T50–2 at 160° C. that is greater than T50–1 and is about 2.5 to about 5 minutes, wherein the first and second rubber layers each independently have a thickness of about 0.4 to about 3 mm, wherein the tire includes an inner liner and the radio device is positioned radially inward of the inner liner with the second layer against the inner liner and the first rubber layer facing radially inward, wherein the first rubber layer meets each of the following:
a. an elongation at break at 23° C. of less than 150%;
b. a 50% modulus at 23° C. of about 3.5 MPa to about 6 MPa;
c. a tension at break at 23° C. of about 9 MPa to about 15 MPa; or
d. a Mooney viscosity ML1+4 at 130° C. of about 43 to about 57, and wherein the second rubber layer meets each of the following:
e. an elongation at break at 23° C. of at least 300%;
f. a 50% modulus at 23° C. of about 6 MPa to about 10 MPa;
g. a tension at break at 23° C. of about 12 MPa to about 20 MPa; or
h. a Mooney viscosity ML1+4 at 130° C. of about 46 to about 60, positioning the enclosed radio device against the inner liner, and then curing the uncured tire carcass together with the enclosed radio device.

9. The method of claim 8, wherein the curing includes use of a pebble-surface rubber curing bladder.

10. The method of claim 8, wherein the 100 parts of the at least one diene-based rubber of the first rubber layer includes a majority by weight of polybutadiene, polyisoprene, natural rubber, or mixtures thereof, and no more than 10 parts in total of EPDM, butyl rubber, halogenated butyl rubber, or nitrile rubber, and wherein the 100 parts of the at least one diene-based rubber of the second rubber layer includes a majority by weight of polyisoprene, natural rubber, styrene-butadiene rubber, or mixtures thereof, and no more than 10 parts in total of EPDM, butyl rubber, halogenated butyl rubber, or nitrile rubber.

11. The method of claim 8, wherein the at least one filler of the first rubber layer includes about 30 to about 50 phr of carbon black, and the at least one filler of the second rubber layer includes about 30 to about 50 phr of at least one filler selected from carbon black, silica, and mixtures thereof.

12. The method of claim 8, wherein the cure package of the first rubber layer includes sulfur as a vulcanizing agent and at least one vulcanization accelerator with a weight ratio of vulcanization accelerator to sulfur of 0.7:1 to 1.5:1, and the cure package of the second rubber layer includes sulfur as a vulcanizing agent and at least one vulcanization accelerator with a weight ratio of vulcanization accelerator to sulfur of no more than 0.6:1.

13. The tire of claim 3, wherein the inner liner is the radially innermost component of the tire.

14. The method of claim 8, wherein the inner liner is the radially innermost component of the tire.

* * * * *